United States Patent [19]

Love

[11] 3,910,433
[45] Oct. 7, 1975

[54] VEHICLE HAVING FRONT END LOADER
[76] Inventor: Richard R. Love, P. O. Box 468, Buhl, Idaho 83316
[22] Filed: July 26, 1974
[21] Appl. No.: 492,226

[52] U.S. Cl................ 214/75 R; 214/104; 214/302; 214/313
[51] Int. Cl.² ........................................... B60P 1/44
[58] Field of Search ........... 214/102, 104, 707, 713, 214/714, 715, 75 R, 83, 313, 134, 302, 62 R, 47

[56] References Cited
UNITED STATES PATENTS
| 936,517 | 10/1909 | Brower | 214/104 |
| 2,798,621 | 7/1957 | Tracy | 214/75 R |
| 3,074,570 | 1/1963 | Venziani | 214/75 R |
| 3,282,453 | 11/1966 | Wood | 214/302 |
| 3,732,997 | 5/1973 | Reavis et al. | 214/302 |

Primary Examiner—Robert J. Spar
Assistant Examiner—Lawrence J. Oresky
Attorney, Agent, or Firm—Kemon, Palmer & Estabrook

[57] ABSTRACT

A vehicle, such as a truck, having a scoop or bucket mounted on the front end thereof. A suitable trackway is provided that extends from the front end of the truck to a point slightly in rear of the truck cab and over front portion of the truck body. The trackway has a scoop mounted thereon for movement thereover and means are provided at the upper end of the trackway to facilitate the pivoting and dumping of the contents of the scoop into the body of the truck.

8 Claims, 4 Drawing Figures

VEHICLE HAVING FRONT END LOADER

BACKGROUND OF THE INVENTION

The present invention is directed to a roadway vehicle having external cooperating means for loading or unloading same.

The usual type of loader that is positioned at the front end of a truck or similar vehicle consists of a scoop or bucket pivotally mounted on the outer end of a pair of spaced parallel arm members. The inner end of the arms are also pivotally mounted on the sides of a truck or vehicle and through the use of hydraulically actuated piston and cylinders, the arms and scoop are moved about a horizontal axis so as to bring the scoop into a position overlying the body of the truck. The scoop or bucket is then pivoted with respect to the arms by a suitable piston and cylinder to permit the contents of the scoop or bucket to be discharged into the body of the truck. A structure of the foregoing type is dependent upon a hydraulic system for the raising, dumping, and lowering of the scoop or bucket which arrangement entails a relatively high cost of installation and in some instances of operation.

In loaders consisting of a scoop or bucket that is positioned at the front end of a truck or vehicle and designed to move over a trackway carried by said truck the manner of pivoting the scoop or bucket to effect a discharge of its contents often presents a problem. In addition, the manner of elevating the scoop or bucket as it is moved over the trackway also presents a problem. The pivotal movement of the scoop and its return to an upright position in many instances requires the use of a piston and a cylinder structure or the use of a plurality of meshing gears.

SUMMARY OF THE INVENTION

The present invention is directed to the concept of detachably mounting one end of a trackway to the front end of a truck with the rear or upper end of the trackway being supported upon the forward end of the truck body. This concept readily lends itself to the utilization of a truck or vehicle to carry out a number of different operations. A suitable scoop or bucket is mounted upon the trackway and by means of a cable and a winch, the scoop is moved along the trackway. A rack and pinion arrangement is provided to effect a pivoting of the scoop in order to discharge its contents while the scoop is returned to its starting position at the foot of the trackway by gravity.

An object of the present invention provides a truck with a readily detachable front end loader having a portion of a trackway arranged to pivot about an axis with a scoop or bucket thereon to effect a discharge of the contents of said scoop or bucket.

Another object is to provide a trackway that permits the scoop or bucket to return by gravity to its initial or starting position.

Another object is to provide a front end loader for a truck which is quickly and easily attached to or removed from said truck.

DESCRIPTION OF THE PREFERRED EMBODIMENT

Figure 1:
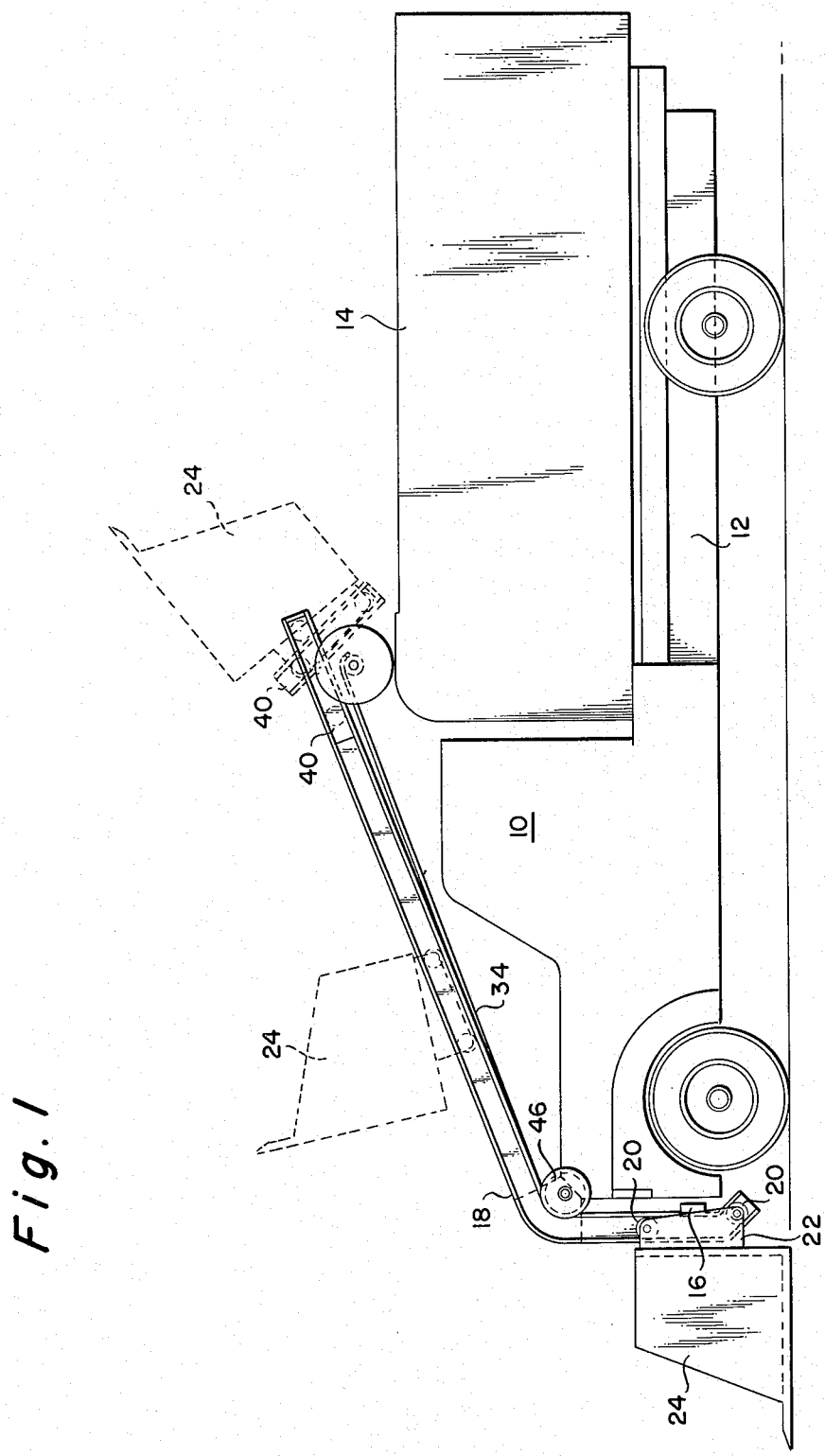
FIG. 1 is a side elevational view of a truck with the loading mechanism of the present invention mounted on the forward end thereof.

Referring to the drawing, there is shown in FIG. 1 a conventional truck consisting of a cab 10, chassis or frame 12 with a body 14 mounted thereon. The body 14 is preferably of the fixed type as distinguished from a dump-type of body and may very readily have provided on the rear end thereof a suitable discharge mechanism such as a spreader or the like, not shown. The front end of the truck is provided with a conventional bumper 16 which has clamped or bolted thereto the lower or forward end of a pair of track members 18, only one of which is shown in FIG. 1.

The track members 18 are of channel configuration and arranged in spaced parallel relation to one another for receiving and guiding a plurality of wheels 20 that are mounted at the upper and lower ends of a plate member 22 which in turn supports a scoop or bucket 24.

The top or upper ends of the track members 18 are supported or carried by the forward end of the truck body 14 through suitable supports or brackets, not shown. The upper ends of the track members 18 have secured to the lower surfaces thereof, by any suitable means, such as welding or the like, not shown, support members or plates 26, FIGS. 2–4. The support members or plates 26 are arranged to project outwardly from the track members 18 in the same vertical plane as each track member. The support members 26 are formed, adjacent their free ends, with suitable bearing supports for receiving a rotatable power shaft 28, FIG. 4. The outer end portions of the power shaft 28 have mounted thereon a sprocket 30 and a narrow winch 32. The winch 32 may be secured to the sprocket 30 which in turn is driven by the power shaft 28 or said sprocket and winch may be so mounted on the power shaft as to be driven by said shaft. The sprocket 30 is adapted to have entrained thereabout a sprocket chain, not shown, which is driven by a hydraulic motor, not shown, that is adapted to be mounted on the truck. The narrow winch 32 is configured to receive one end of a cable 34 which has its other end connected to the spindles 23 of the lowermost roller 20 carried by the plate members 22 which are in turn connected to the scoop or bucket 24. Thus, the scoop or bucket 24 is moved along the track members 18 as the cable 34 is wound upon the winch 32.

Figure 2:
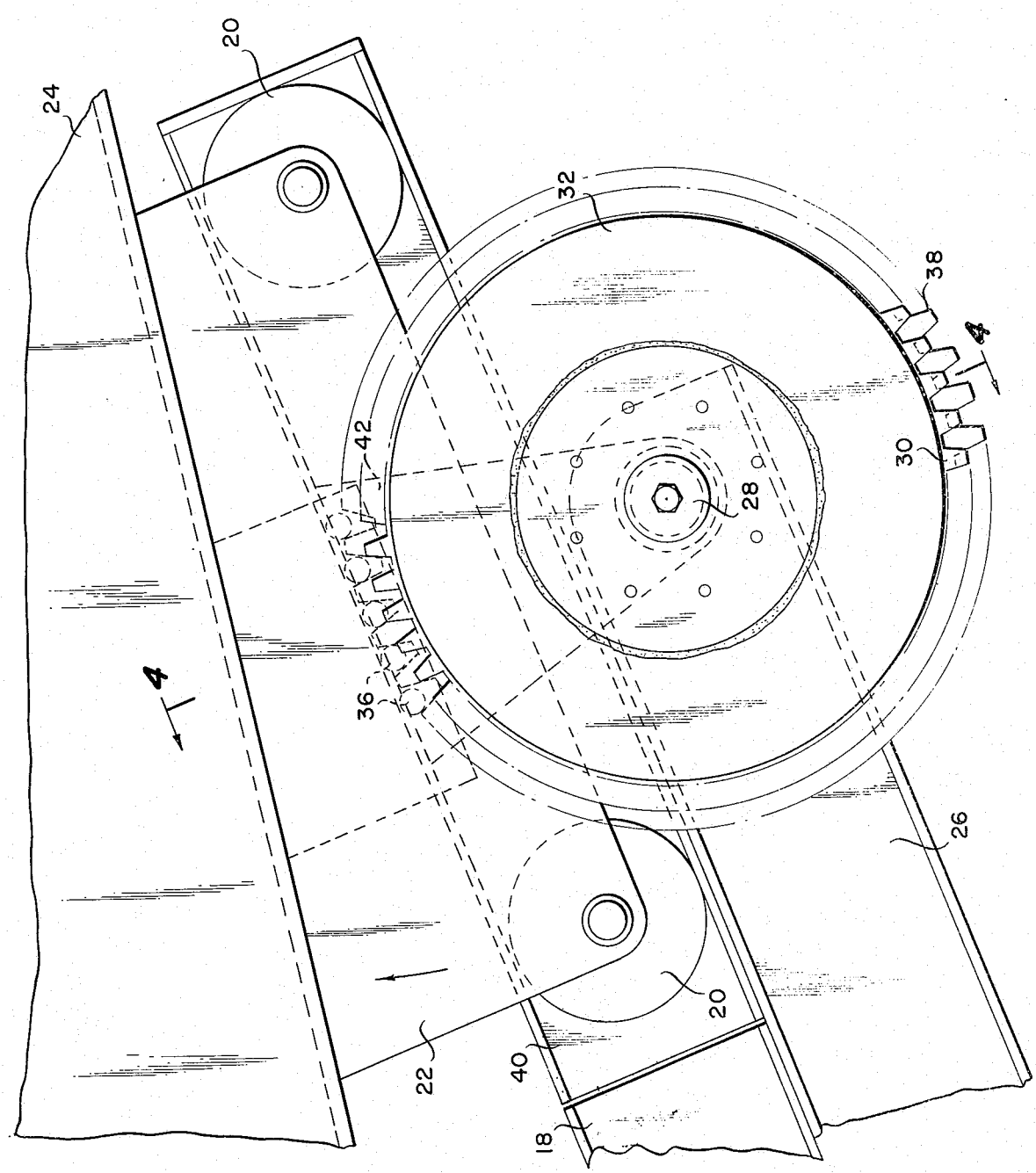
FIG. 2 is an enlarged detailed view of the upper end portion of the trackway with a fragmentary portion of the scoop positioned thereon.
Figure 3:
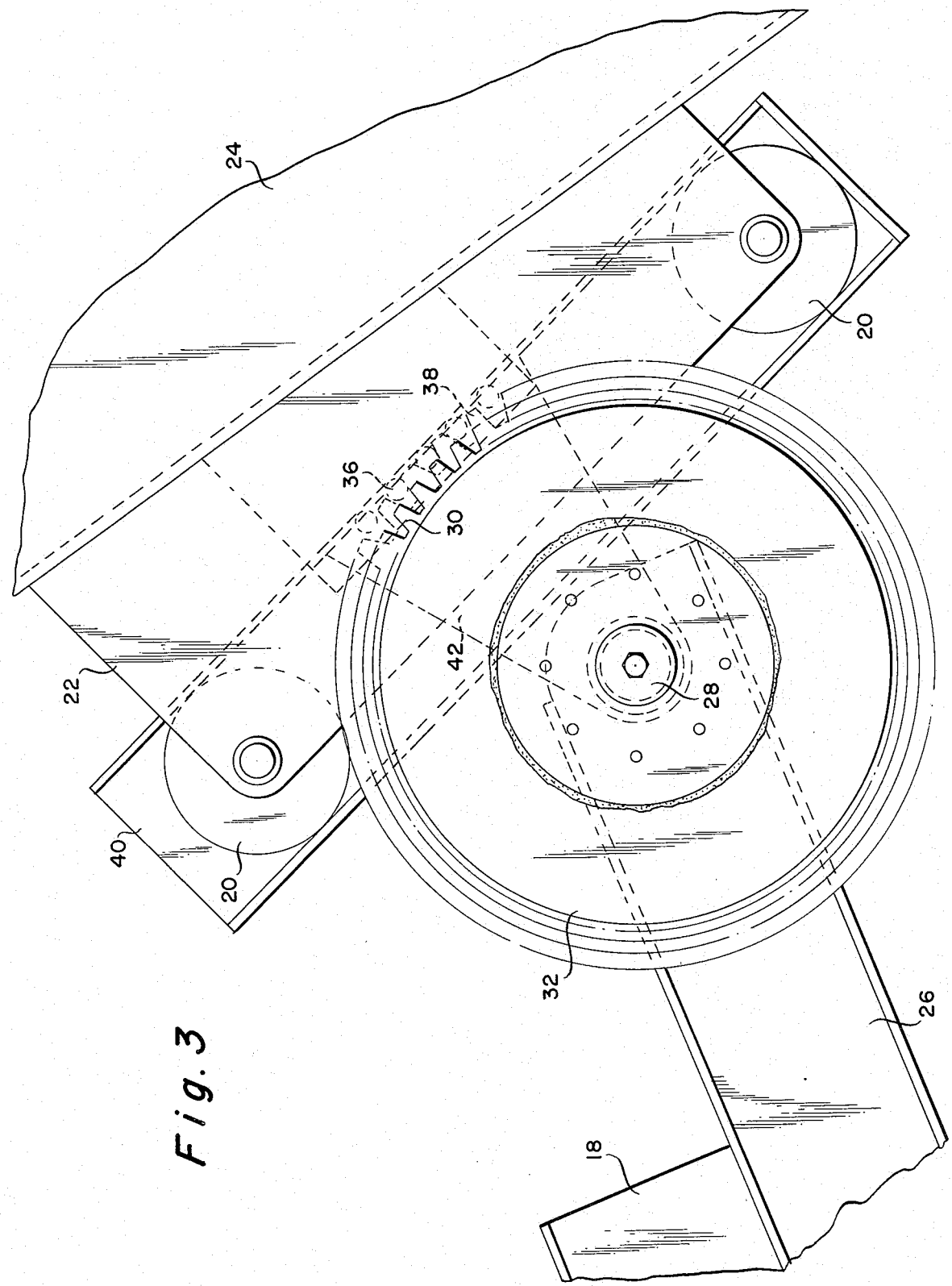
FIG. 3 is a view similar to that of FIG. 2 showing the pivotal portion of the trackway and scoop in a position to effect a discharge of the contents of the scoop.
Figure 4:
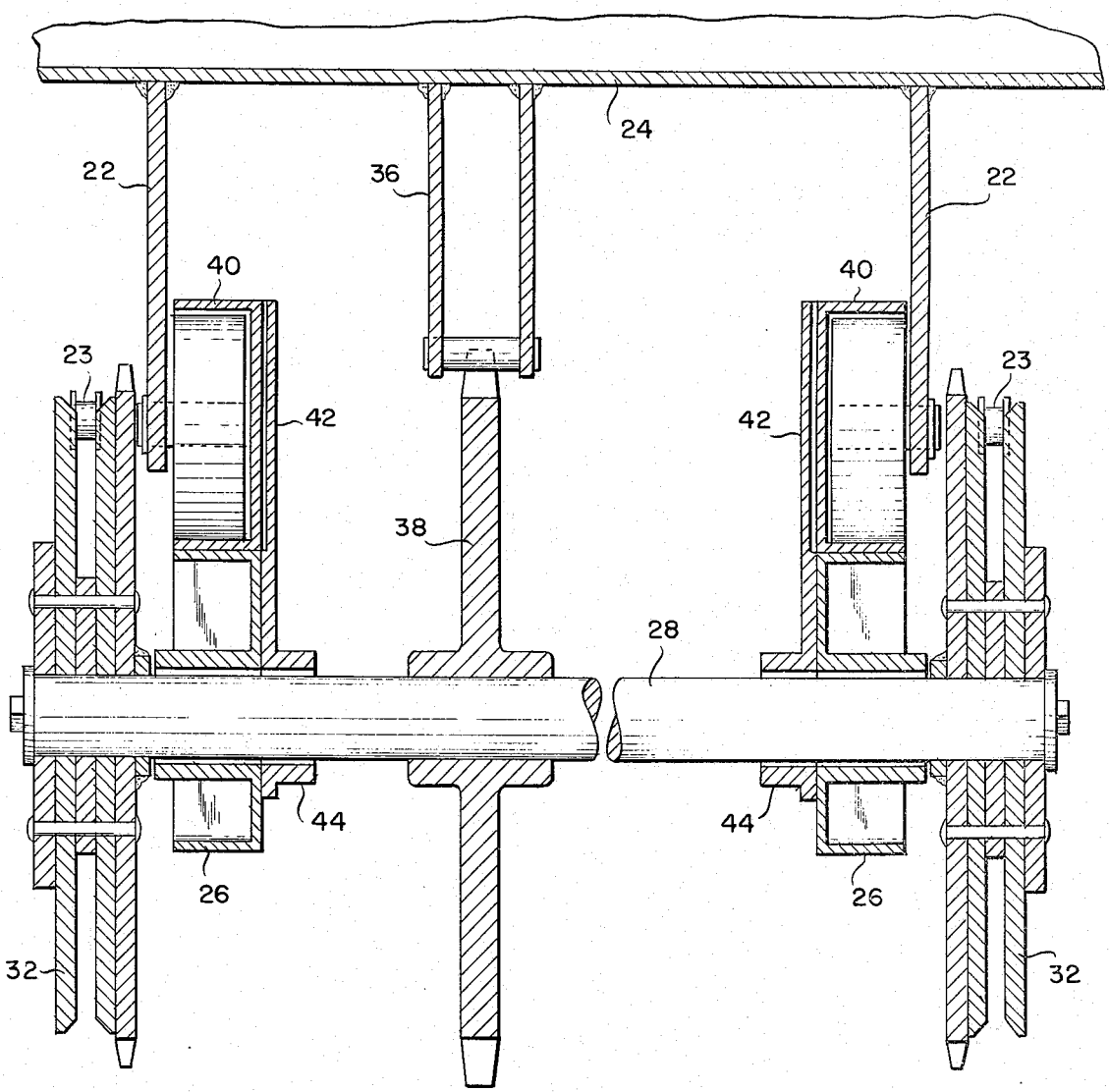
FIG. 4 is a vertical sectional view of the drive mechanism for pivoting the scoop and end of the trackway, the view being taken on the line 4—4, FIG. 2.

The lower surface of the scoop or bucket 24 intermediate the plate members 22 is provided with a rack member 36, FIG. 4, which is adapted to engage a suitable pinion 38 affixed to the power shaft 28 as the scoop or bucket 24 approaches the upper end of the track members 18. As shown in FIGS. 2 and 3, the ends of the track members 18 have associated therewith track segments 40 which project outwardly from the ends of the track members. The track segments 40 are designed to rest on the support members or plates 26 and are carried by brackets 42 which are mounted on the power shaft 28 by suitable bearing supports 44. The track segments 40 may have one end of a link member, not shown, connected thereto with the other end of the link member being connected to the hydraulic motor, not shown, for the purpose of disengaging said motor upon the movement of the track segments about the power shaft 28.

In the use of the present device, the track members 18 may be positioned on the vehicle by securing the lower ends thereof to the bumper 16 of the vehicle by suitable clamps or the like with the upper end of the track members being secured to the front portion of the truck body 14 by suitable clamps or supports. The cable 34 with one end attached to the plate member 22 of the scoop or bucket 24 is entrained over a suitable pulley 46 that is carried by the track members 18. The other end of the cable is secured to the narrow winch 32 that is carried by the power shaft 28.

The power shaft 28 in conjunction with the winch 32 is driven by the sprocket 30 that has a chain entrained thereover, not shown, and which chain is in turn connected to a suitable hydraulic motor, not shown, carried by the truck. The rotation of the power shaft 28 causes the narrow winch 32 to rotate and thus wind the cable 34 thereon with the cable being coiled upon itself which tends to develop power to facilitate the elevation of the scoop or bucket along the trackway 18. As the cable is wound upon the winch 32, the initial winding of the cable upon itself will develop power when the scoop is at the lower end of the track members 18 to initiate the elevation of the scoop or bucket along the trackways. As the scoop or bucket proceeds up the trackways towards the upper end thereof, the speed of same will increase due to the increase diameter of the cable that is being wound upon the winch 32.

As the scoop or bucket 24 moves from the track members 18 onto the track segments 40, the upper most wheel 20 of the scoop or bucket 24 will engage a stop plate 48 at the end of the track segments 40 which engagement will position the scoop or bucket within the area of the track segments 40. As the scoop or bucket 24 moves into the area of the track segments 40, the pinion 38 carried by the power shaft 28 will engage the rack 30 mounted on the bottom surface of the scoop or bucket so that the continued rotation of the pinion 38 will cause the scoop or bucket to complete its final movement onto the track segments 40. The continued rotation of the power shaft and pinion 38 will cause the track segment 40 with the scoop or bucket 24 positioned thereon to rotate about the power shaft 28 so as to effect a discharge of the material within the scoop or bucket into the truck body 14. The brackets 42 which are connected to the track segments 40 and carried by the shaft 28 enables the track segments 40 and scoop or bucket 24 to pivot about the power shaft 28 upon the engagement of the pinion 38 with the rack 36.

Upon the discharge of the material from the scoop or bucket 24 into the truck body 14, the rotation of the sprocket 30 and power shaft 28 is reversed by reversing the rotation of the hydraulic motor carried by the truck so as to return the track segments to a position upon the support members 26 wherein said track segments are in alignment with the track members 18. As the track segments 40 are brought into alignment with the track members 18 the rotation of the pinion 38 will impart initial movement to the scoop or bucket 24 by means of the rack 36 so that the wheels 20 of the scoop or bucket will then move onto the track members 18 and due to the force of gravity, the scoop or bucket 24 will be returned to its lower or initial position during which time of course, the winch 32 is being unwound to pay out the cable 34.

The loading device of the present application has been found to be extremely adaptable in the handling of pit silage. The truck body 14 may be provided with a suitable feeder or spreader mechanism at the rear end thereof so that when the truck is driven into a pit silage and the scoop or bucket 24 is loaded with said material, it can then be elevated by means of the track members 18 to where the scoop or bucket is pivoted about the power shaft 28 so as to effect a discharge of the silage material into the truck body 14. After repeated loadings of the truck body through the foregoing operation, the truck may then be driven into the area where livestock is located and the spreader or feeder mechanism at the end of the truck body 14 may then be actuated so as to discharge the silage material that has previously been loaded into said truck body.

Although the foregoing description is necessarily of a detailed character, in order that the invention may be completely set forth, it is to be understood that the specific terminology is not intended to be restrictive or confining, and that various rearrangements of parts and modifications of detail may be resorted to without departing from the scope or spirit of the invention as herein claimed.

I claim:

1. In a vehicle front end loading device comprising a vehicle having an open top body, a pair of track members mounted on the forward end of said vehicle and extending over a portion of said body, a scoop mounted on said track members for movement therealong, a power shaft carried by said track members, means for rotatably driving said shaft, segmented members carried by said power shaft for movement thereabout, said segmented members being aligned with said track members to receive said scoop and means carried by said power shaft and engagable with said scoop for moving said scoop and segmented members about said power shaft for discharging the contents of said scoop into the body of the truck.

2. In a vehicle front end loading device as set forth in claim 1 wherein said track members are arranged in spaced parallel relation to one another with one end of the track members being connected to the front of the vehicle and the other end supported by said body.

3. In a vehicle front end loading device as set forth in claim 1 wherein the end of said track members extending over said body have support members secured thereto, said power shaft being rotatably positioned in said support members with said segmented members being positioned upon said support members in alignment with said track members.

4. In a vehicle front end loading device as set forth in claim 1 wherein said power shaft has a driving sprocket mounted thereon, a narrow winch affixed to said power shaft, a cable having an end connected to said scoop, said cable entrained about a pulley on said track members with the other end of said cable about said narrow winch, said cable upon the rotation of said power shaft being wound coil upon coil on said winch to increase the speed of said scoop in moving over said track members.

5. In a vehicle front end loading device as set forth in claim 1 wherein said scoop is formed with a rack member on the bottom surface thereof, a pinion mounted upon said power shaft for engaging said rack to move said scoop about said power shaft.

6. In a vehicle front end loading device as set forth in claim 1 wherein said scoop is provided with wheels for moving over said track members and said segmented members are provided with stop plates for engagement by said vehicle to position said scoop over said power shaft and within said segmented members.

7. In a vehicle front end loading device as set forth in claim 3 wherein said power shaft has bracket members supported thereon, said bracket members being secured to said segmented members.

8. In a vehicle front end loading device as set forth in claim 5 wherein said power shaft upon rotation in one direction moves said scoop along said track members and into said segmented members prior to rotating said segmented members and scoop about said power shaft and upon rotation in the other direction causes said segmented members to move back into alignment with said track members to return said scoop to its initial position.

* * * * *